United States Patent [19]

Rahman

[11] Patent Number: 4,997,933

[45] Date of Patent: Mar. 5, 1991

[54] CELLULOSE AMINOMETHANATE BY ACID NEUTRALIZATION

[75] Inventor: Matiur Rahman, Champaign, Ill.

[73] Assignee: Teepak, Inc., Westchester, Ill.

[21] Appl. No.: 365,272

[22] Filed: Jun. 12, 1989

[51] Int. Cl.$^5$ ........................... C08B 3/00; A22C 13/00
[52] U.S. Cl. ........................................ 536/30; 536/32; 426/105
[58] Field of Search ................ 536/30, 32; 8/125; 138/118.1; 426/105

[56] References Cited

U.S. PATENT DOCUMENTS

| | | | |
|---|---|---|---|
| 1,771,461 | 7/1930 | Lilienfeld | 536/30 |
| 2,129,708 | 9/1938 | Schreiber | 536/30 |
| 2,134,825 | 11/1938 | Hill et al. | |
| 3,291,789 | 12/1966 | Bridgeford | 536/30 |
| 3,557,082 | 1/1971 | Bridgeford | 536/30 |
| 4,404,369 | 9/1983 | Huttunen et al. | |
| 4,456,749 | 6/1984 | Mandell et al. | 536/30 |
| 4,486,585 | 12/1984 | Turunen et al. | 536/30 |
| 4,526,620 | 7/1985 | Selin et al. | 106/203 |
| 4,530,999 | 7/1985 | Selin et al. | 536/30 |
| 4,567,255 | 1/1986 | Eklund et al. | 536/30 |
| 4,583,984 | 4/1986 | Turunen et al. | 8/125 |
| 4,639,515 | 1/1987 | Turunen et al. | 536/30 |
| 4,762,564 | 8/1988 | Bridgeford | 106/204 |
| 4,777,249 | 10/1988 | Bridgeford | 536/30 |
| 4,789,006 | 12/1988 | Bridgeford et al. | 138/118.1 |

FOREIGN PATENT DOCUMENTS 85890246  4/1986  European Pat. Off. .

*Primary Examiner*—Nathan M. Nutter
*Attorney, Agent, or Firm*—Howard M. Ellis; William J. Crossetta; Michael L. Dunn

[57] ABSTRACT

This invention relates to an improvement to a process for synthesizing cellulose aminomethanate which comprises slurrying cellulose in an aqueous caustic solution, in the presence of urea; steeping the slurried mixture for a time sufficient to permit swelling of the cellulose for uniform distribution of the urea; and, neutralizing the caustic solution of the steeped slurry by treatment with an acid neutralizing solution. When cellulose aminomethanate is manufactured from product prepared in accord with this process, it has a uniform distribution of substituent throughout the cellulose at the molecular level and comprises a suitable product for manufacturing sausage casing.

24 Claims, No Drawings

CELLULOSE AMINOMETHANATE BY ACID NEUTRALIZATION

BACKGROUND OF THE INVENTION (a) Field of the Invention

This invention relates to a process for synthesizing cellulose aminomethanate which has utility in the manufacture of sausage casing and other cellulose products.

(b) History of the Prior Art

Cellulose xanthate, dissolved as viscose, has been utilized for many years in the manufacture of regenerated cellulose film which has particular utility as sausage casings. With the increase in environmental awareness, concerns have been raised to the environmental management of flammable and toxic reactants and by-products of the viscose manufacturing process. The rapidly escalating cost of by-product management, coupled with the intrinsic costs of additives, such as plasticizers, which are necessary when utilizing viscose for regenerated cellulose sausage casings, has forced the sausage casing industry to search for viable alternatives to current viscose manufacturing processes.

One alternative, which has more recently been the focus of research for possible replacement of the viscose process in the sausage casing industry is the use of ammonia derivatives, such as urea, reacted with cellulose to form a soluble cellulose derivative. The use of such materials is preferable as by-products are easily managed and do not appear to represent significant environmental impact. U.S. Pat. Nos. 1,771,461; 2,134,825; and 2,129,708 comprise some of the early work in that technology demonstrating that film products are obtainable that have utility. Though the final products formed showed potential for use as a film, it wasn't until U.S. Pat. No. 4,789,006 that a product was produced having a combination of properties commercially acceptable for use as sausage casings.

Various different terminology has been used to describe the products of cellulose and urea, such as cellulose aminoformates, cellulose carbamates, cellulose aminomethanoates/ and cellulose aminomethanates as adopted in U.S. Pat. No. 4,789,006. To deter further confusion, the products formed with cellulose and urea as presented in the above patents and hereinafter will be referred to as cellulose aminomethanates.

Even though a cellulose aminomethanate product can now be made which is suitable for use as a sausage casing, problems still exist in the manufacturing process occasioned by the difficulty of removing prior art carriers, such as sodium hydroxide, used to obtain uniform distribution of the urea through the cellulose structure prior to the formation of the cellulose aminomethanate. This need for uniform distribution of the urea is disclosed in U.S. Pat. No. 4,404,369 and achieved by using liquid ammonia which can be subsequently removed by volatilization. However, liquid ammonia is highly volatile, toxic, pungent, forms explosive mixtures with air and requires excessive refrigeration and special equipment for safe handling and recovery.

In a later process disclosed in the European Patent Application No. 85890246.3 (1985), the uniform distribution was achieved by using high concentrations of sodium hydroxide which was then washed out with neutral aqueous urea. Such process, however, requires the handling of large volumes of liquid and creates associated recovery problems.

It is an object of this invention to improve the distribution of urea throughout the cellulose structure prior to the formation of cellulose aminomethanate.

It is another object of this invention to provide an improved cellulose aminomethanate material having uniform distribution of aminomethanate substituent.

It is a further object of this invention to provide a convenient means for processing cellulose which has been steeped in sodium hydroxide.

SUMMARY OF THE INVENTION

This invention is based on the surprise finding that when sodium hydroxide is used for swelling cellulose for the uniform distribution of urea, it can be directly neutralized with a suitable acid. The corresponding salt product, even if left in the cellulose-urea reactant mixture, does not adversely affect subsequent thermal cure reactions.

The aforementioned objects and more are achieved by an improvement to the process for synthesizing cellulose aminomethanate which comprises slurrying cellulose in an aqueous caustic solution, in the presence of urea, steeping the slurried mixture for a time sufficient to permit swelling of the cellulose for uniform distribution of the urea, and neutralizing the caustic solution of the steeped slurry by treatment with an acid neutralizing solution.

It was found that when the cellulose aminomethanate is manufactured from product prepared in accord with this process, it has a uniform distribution of the substituent throughout the cellulose at the molecular level and comprises a suitable product for manufacturing sausage casing.

DETAILED DESCRIPTION OF THE INVENTION

The synthesis of cellulose aminomethanate suitable for use in the manufacture of sausage casings involves at least three controlling elements. First, the cellulose structure of the material used must be impregnated with urea in a uniformly distributed manner to assure that a final product will be obtained having suitable consistency for the manufacture of sausage casings. Second, the thus impregnated cellulose structure must be treated to efficiently decompose the urea to form the cellulose aminomethanate derivative. Third, the thus formed derivative usually is processed to provide a storageable raw material for the subsequent manufacture of sausage casing.

A critical factor in the above sequence is the method used to obtain uniform urea distribution in the cellulose and the efficiency of the decomposition process forming the derivative.

In order to achieve uniform distribution, it has been found that the hydrogen bonded networks and associated crystalline structure of cellulose need to be broken to make the cellulose highly accessible to the urea. In the process of U.S. Pat. No. 4,404,369 this accessibility is accomplished by steeping cellulose in a solution of urea in liquid ammonia, the liquid ammonia apparently acting to cause the cellulose to swell, which makes the cellulose more accessible to the urea. The product of such processing appears to have a suitable distribution of urea within the cellulose and can be reacted to form a cellulose aminomethanate of appropriate quality for manufacturing sausage casing as described in U.S. Pat. No. 4,789,006.

In U.S. Pat. Nos. 2,129,708 and 2,134,825 and European Application 85890246.3 the method of achieving distribution of the urea is by steeping cellulose in urea dissolved in sodium hydroxide at room temperature. Such process has merit in that swelling of the cellulose structure is achieved and urea can theoretically be distributed therethrough. A problem exists however, in the removal of the sodium hydroxide after the urea has been distributed, making it difficult to produce a suitable cellulose aminomethanate product. The removal of caustic by prior art means requires either direct pressing or multiple washings with dilute aqueous urea and pressing steps. The direct pressing leaves enough caustic with the cellulose to degrade it to undesirably lower average degree of polymerization (DP) levels during the thermal cure step. The washing process increases material and energy costs and creates a waste-product disposal problem.

It has been discovered that if the cellulose is slurried in an aqueous caustic solution, which also contains an appropriate quantity of urea for reaction with the cellulose, and the slurry is steeped to efficiently cause the cellulose to swell and accept uniform distribution of the urea, that the slurry can be thereafter neutralized without adverse effect to the quality of the cellulose aminomethanate manufactured therefrom. When low concentration caustic solutions, of minimum volume and low temperature, are utilized in steeping, an adequate cellulose aminomethanate product quality is achieved without the multiple washings of the slurry with dilute aqueous urea as required by the prior art and without the concurrent material, energy and waste-product disposal costs associated therewith.

Thus, instead of repeated washing and pressing to remove caustic as required by the prior art, the process of this invention achieves an adequate cellulose aminomethanate product using a processing step which can result in significant material, energy and waste-product disposal cost savings.

In the following discussion and description of the invention by slurried is meant that the cellulose material has been divided into pieces and is intimately intermingled and wetted with a urea containing aqueous caustic solution. The size of the cellulose pieces in the slurry can vary greatly with the form that the cellulose is in as well as the time that is available for the caustic solution to break down and thoroughly wet the cellulose. It was found that when using thin cellulose, dissolving pulp sheets that cellulose pieces smaller than several inches square were generally adequately broken down and wetted within 5-10 minutes, a reasonable time frame for commercial use.

The concentration of the aqueous caustic/urea solution used can be of any concentration practiced by the prior art including the high, medium and low concentration caustic treatments described in various of the prior art patents including the process of U.S. Patent Application Ser. No. 365,267, filed on even date herewith, by M. Rahman and D. Bridgeford entitled Preparation of Cellulose Aminomethanate and incorporated herewith by reference.

Generally it has been found desirable to limit the caustic concentration in accord with the aforesaid application to range from about 2 to about 10% caustic by weight and preferably from about 4 to about 8% by weight caustic. Such low concentrations are preferable in that the material cost of neutralization is also reduced. The temperature of the caustic solution can vary greatly, anywhere from below about −15 degrees centigrade to well in excess of room temperature, above about 35 degrees centigrade. Generally, when using low concentrations of caustic it is desirable to use lower temperatures, as disclosed in the foregoing identified application, from about −15 to about +10 C.

The concentration of urea necessary to provide adequate reactant for the formation of cellulose aminomethanate generally ranges from about 12 to about 35% urea by weight and preferably from about 15 to about 30% by weight. A preferred aqueous solution would contain from about 4 to about 8% caustic and from about 15 to about 30% urea by weight.

The amount of urea present in the caustic solution does not appear to markedly change the degree of swelling for a given caustic concentration and a given steeping temperature. Thus, the concentration of urea will preferably be adjusted in accord with the cellulose content of the slurry to attain adequate urea for reaction with the cellulose upon uniform distribution. In practical terms the amount of urea used should constitute a generous excess in order to obtain an initially high degree of substitution for good quality cellulose aminomethanate.

The volume of aqueous solution used in the process is generally preferred to be minimized to reduce waste products. The volume of aqueous component must be sufficient to assure wetting of the cellulose while containing adequate quantities of caustic to swell the cellulose and urea to penetrate therewith. Thus, the greater the concentration of caustic, the less volume may be utilized. Generally, when using low caustic concentrations, a ratio of combined caustic and urea containing aqueous solution to cellulose should be less than about 15:1 and preferably less than about 10:1 when using dilute caustic solutions.

The cellulose will generally be wetted very quickly utilizing the aqueous caustic/ urea containing solutions of this process. It is preferred to agitate or mix the components so that a uniform mixture is quickly obtained, however mixing is not always necessary depending upon the form of cellulose used and/or the method of addition of the caustic and urea practiced. For example, the cellulose may comprise an aqueous slurry to which caustic and/or urea are added in amounts appropriate to form a solution with the aqueous component of the slurry or a portion thereof.

Thus, it is within the contemplation of this invention to include the addition of high caustic and/or urea concentrations to an aqueous cellulose slurry to form a low caustic concentration slurry, as well as treating the cellulose material with a low concentration caustic solution.

Generally, any temperature of the prior art can be used in the steeping step of the process. In accord with the afore identified application however it is desirable to initially mix the cellulose with the caustic/urea solution at ambient temperature or below, then reduce the temperature of the mixture to below about 0° C. However, cold caustic/urea solution can be added to a higher temperature cellulose material and the reverse or both may be cold or hot. In a similar manner, caustic and urea can be added to a cooled cellulose slurry or the reverse. The only temperature requirement of this invention is that the cellulose, the caustic and the urea be brought together at an adequate temperature, concentration and relative weight ratio, and steeped for a sufficient time to permit swelling of the cellulose and attachment of the urea to the swelled cellulose molecule.

Generally, in processing of a cellulose pulp slurry, steeping at an appropriate temperature for from about 15 minutes to an hour is adequate. The slurry should be steeped for an amount of time sufficient to swell the cellulose and allow migration of the urea into the cellulose structure, however, steeping can be continued for longer times as long as no significant adverse effect is imposed upon the cellulose structure.

Neutralization of the steeped slurry is typically the next step in the process, however it also may be imposed during the steeping process or may be withheld until after an initial pressing and/or washing step if desired. Neutralization can be achieved by simply adding an appropriate amount of an acidic neutralizing solution to the steeping solution. The neutralized caustic may thereafter be removed or the neutralized aqueous component of the slurry may be removed by pressing. The acidic solution may be concentrated or dilute. Generally it is preferred to utilize an acidic extraction solution, wherein the caustic solution is thereafter extracted.

A suitable and convenient method of cellulose aminomethanate synthesis with high DP cellulose, can be achieved through acid neutralization of the caustic after the aqueous caustic/urea steep. No residual caustic appears to be left to degrade the cellulose or consume the reagent and form intermediates in side reactions. This in turn permits better monitoring and control over the extent of reaction by following its stoichiometry quantitatively.

The neutralization can be carried out with any acid neutralizing agent such as sulfuric, acetic or any suitable inorganic or organic acid. Carbon dioxide and even acid urea solutions can also be used. After the neutralization and separation of the cellulose/urea mixture, the neutral liquor contains urea and the salt of the neutralizing acid with few, if any, dissolved cellulose fragments. Thus the liquor can be simply and conveniently regenerated through an ion-exchanger and re-used after appropriate adjustment of concentrations. Surprisingly, the sodium sulfate left in the cellulose/urea mixture when using sulfuric acid neutralizing solution does not appear to adversely affect the subsequent thermal reaction to form the cellulose aminomethanate.

The acid neutralization technique can be applied to low caustic/low temperature steeping, high caustic/room temperature steeping and any combination of conditions. It can also be applied to separately mercerized alkali cellulose crumb as produced in commercial viscose processes, by subsequent steeping in aqueous urea before neutralization. After neutralization and separation, the urea-cellulose can be thermally decomposed to produce the cellulose aminomethanate. The product can be washed with water, dissolved in cold sodium hydroxide solutions with or without added Zincate. The resulting viscous solution can then be used to make strong films or fibers by processes similar to the conventional viscose process.

Pressing the intermingled urea and cellulose is typically the next step in the production of the cellulose aminomethanate. The pressing step acts to both rid the slurry of its aqueous component while embedding the urea in the swelled cellulose. An optional washing step, with dilute urea, acts to disperse remaining salts and assure an excess of urea. Generally only one pressing is necessary and one optional washing with dilute aqueous urea. The washed slurry is then filtered and/or centrifuged to a desired press weight ratio.

It is realized that the presence of small amounts of sodium hydroxide in the pad of urea-impregnated cellulose that has been cured, will result both in some saponification of the urea due to the presence of the caustic, as well as some discoloration, degradation, and depolymerization of the cellulose at high temperatures. In some cases, this depolymerization may be desirable if a very high molecular weight, dissolving pulp was the original starting material. The resulting impregnated cellulose can be cured in some cases under very high temperature, very short curing times, and frequently results in little discoloration. A reduction in $DP_V$ due to high temperature cure is observed as taking place, with little reduction being seen as found in prior art processes.

The following examples are provided to exemplify the invention and are not meant to be a limitation thereof.

EXAMPLE I

Ten (10) grams of high purity, high alpha content, 510–530 average degree of polymerization determined from viscosity ($DP_V$) cellulose (Buckeye V-65 pulp) was added to 120 g of an aqueous steeping solution containing 5% sodium hydroxide and 22.5% urea, at room temperature. After initial dispersion with a spatula, the mixture was cooled in a $-16°$ C. freezer for 1 hour. During cooling the mixture was occasionally removed and stirred. After an hour, the mixture was diluted with 480g of 25% urea and then treated with 8g of 81% aqueous sulfuric acid to neutralize approximately 90% of the caustic.

The mixture was then suction filtered to produce a pad having a press weight ratio of 4. Press weight ratio (PWR) is calculated by dividing the wet weight of the pad by the weight of the dry cellulose starting material. The amount of residual caustic was measured to be only 0.35% based on the dry weight of cellulose. The pad was then dried at 100–110° C. in a forced air evaporation oven to about its calculated dry weight (17.7g) and thereafter heated at 130° C. for thermal reaction until it reached a cured weight of 16.0 g. Calculated cure weight was 15.7 g.

One half of the cured pad, representing 5g of cellulose, was washed with water and then mixed in an alkaline Zincate solution to obtain a final suspension having a composition comprising 7 parts cellulose derivative, 1 part Zinc Oxide, 9 parts sodium hydroxide and 83 parts water.

The suspension was frozen overnight in a freezer at $-16°$ C. On thawing the next day, a glass clear, viscous solution was obtained. The solution was centrifuged, mainly for deaeration, and cast into a thin film on a glass plate. After coagulation and neutralization in conventional coagulation-regeneration baths, washing in water and drying, the film was determined to have a basis weight of 40g/m$^2$ and had a measured rewet Mullen burst strength of 14–15.5 psi.

EXAMPLE II

Twenty (20) grams of cellulose (Buckeye V-65 pulp, average $DP_V$ 530), was mixed with 200 g of 5% (W/W) sodium hydroxide and 30% (W/W) urea and the mixture was cooled overnight in a freezer at $-16°$ C. The next day the mixture was thawed and neutralized with 100 g of 12.25% aqueous sulfuric acid to a phenophthalein end point. After equilibration for 20–30 minutes, the final pH of the slurry was 9.3. The neutral cellulose-urea mixture was collected on a Whatman 541 filter, under suction, using a rubber dam.

The cake was pressed to a press-weight ratio of 4.16 and was then directly heated in a forced air oven maintained at 150° C. A portion of the sample taken after 125 minutes of heating, representing the decomposition of 54% urea or 0.9 mole per mole of anhydroglucose unit, showed an excellent solubility in 9% sodium hydroxide and 1% zinc oxide solvent. The solubility was tested taking a portion of the crude reaction product, representing 2 g of the starting cellulose, washing it three times with lukewarm water in a Waring Blender, and filtering each time through a Whatman 541 filter on a Buchner funnel. Extra water was added to the washed material to make a total of 20 g water.

Ten (10) grams of a solution containing 27% sodium hydroxide and 3% zinc oxide was then added to the wet cellulose derivative. On stirring, at room temperature with a spatula, a uniform suspension was obtained. The suspension was then cooled in a Neslab CB-80 cryobath filled with methanol and maintained at $-16°$ C. Within 5–15 minutes, a glass clear, colorless, fiber-free solution was obtained.

On standing at room temperature, the solution became bubble-free within an hour. A handcast film made from the solution, in accordance with the process of Example I, coagulated-neutralized, washed and dried. The film measured rewet Mullen burst strength of 12.5 psi.

Another portion of the reaction product was washed with water in the same way, dried and analyzed for nitrogen and degree of polymerization (DP). The results showed a nitrogen content of 0.9% representing a degree of aminomethanate substitution (DS) of 0.11 and a $DP_V$ average of 494.

EXAMPLE III

Two hundred (200) grams of cellulose (212g of Avg. $DP_V$ 530, Buckeye V-65 pulp) was mixed with 2000 grams of 8%/20% caustic/urea at room temperature. The mixture was cooled overnight in a freezer at $-20°$ C. and the next day was allowed to thaw. The thawed mixture was diluted with 2000g of 20% aqueous urea and neutralized with 1000g of 20% aqueous sulfuric acid in 20% aqueous urea while stirring mechanically. The pH of the suspension was 3.4. Stirring was continued for 30–40 minutes after neutralization for complete equilibration. The final pH was then adjusted to 8.8 with 13g of 27% sodium hydroxide. After stirring for 10–15 minutes longer, the mixture was filtered and the cellulose-urea mixture was pressed to a weight of 927g. The pressed cake was broken into smaller fragments, placed in a wire basket lined with a porous paper, dried at 102–130° C. in a forced air evaporation oven and finally thermally reacted (cured) at 150° C. to predetermined weight losses in accord with U.S. Patent Application Ser. No. 365,217, filed on even date herewith, by M. Rahman entitled Cellulose Aminomethanate by Weight Loss Monitoring and incorporated herewith by reference.

A portion of the sample, representing weight loss corresponding to the decomposition of 55% of added urea or 1.07 moles per anhydroglucose unit, was washed repeatedly with water and then dissolved in alkaline Zincate, in a manner similar to Example II, to give a polymer concentration of 6%. Handcast films, after coagulation, neutralization, washing and drying as in Example I, showed a basis weight of 37.5g/m$^2$ and a rewet Mullen burst strength of 11 psi.

EXAMPLE IV

Twenty-five (25) grams of alkali cellulose crumb, containing 8g of mercerized and aged cellulose derived from high alpha content sulfate pulp having an average 1065 $DP_V$ (Buckeye V-5 pulp), together with 4 g of sodium hydroxide was mixed into 200g of 20% aqueous urea. The mixture was allowed to stand 1.5 hr. at room temperature and then overnight at 3–4° C. The next day, the mixture was neutralized with 5.8g of glacial acetic acid to a phenolphthalein end point at pH 8–9.5. The mixture was then filtered through a Whatman 541 filter on a Buchner funnel under suction. From the weight of the resulting pad, the urea add-on was calculated to be 48% based on the dry cellulose.

The pad was dried overnight at room temperature and then in a vacuum oven at 100° C. for 15–20 minutes until a constant weight close to the calculated dry weight was reached. The dried pad was then heated at 145° C. for thermal reaction curing.

A portion of the pad was dissolved in cold 8% aqueous sodium hydroxide, adjusting the amount of liquid to obtain a concentration equivalent to 6% cellulose. The resulting clear fiber-free solution was aged 4 days at 3–4° C. and then converted into a handcast film on a glass plate. After coagulation and neutralization in conventional viscose coagulation-regeneration baths, washing in water and drying, the film was determined to have a basis weight of 43.3g/m$^2$ and showed a rewet Mullen burst strength of 15–17 psi. An infrared spectrum of the film showed a strong carbonyl absorption peak at 1710 cm$^{-1}$ from the aminomethanate group.

EXAMPLE V

Fifty (50) grams of alkali-cellulose crumb, containing 16 g of mercerized and aged cellulose, was added to 248g of 30% aqueous urea solution and the mixture was shaken for 1 hour in a mechanical shaker. Carbon dioxide ($CO_2$) gas was then gently passed into the mixture through a fritted glass sparger while stirring mechanically. The amount of $CO_2$ added was monitored by occasional weighing of the mixture. Neutralization was stopped when the weight gain from carbon dioxide corresponded to the equivalent amount of caustic in the crumb. Stirring was continued several minutes thereafter to ensure equivalent $CO_2$ retention in the mixture.

The cellulose-urea-$Na_2CO_3$ slurry was then filtered to a pressed weight of 66.8g, the pressed cake was dried and cured at 135° C. to a weight loss of 3.8g. Solubility testing in cold 8% aqueous sodium hydroxide at 6% polymer concentration gave a clear solution after overnight freezing and next-day thawing. Handcast film, made from the solution in accordance with Example I, was measured to have a rewet Mullen burst strength of 14 psi.

EXAMPLE VI

Seventy-five kilograms of urea was dissolved in 114 Kg of lukewarm tap water and added to 36 Kg of 50% aqueous sodium hydroxide in a sigma-blade planetary mixer. 15.8 Kg of Buckeye V-65 pulp having an average $DP_V$ of 530 and containing 15 Kg of cellulose, was slowly added, during mixing, in the form of 8"×10" sheets. Thorough mixing was insured by bottom-to-top recirculation of the mixture with the help of a diaphragm pump. After 15 minutes, 75 Kg of ice was added to the slurry and the mixing/recirculation continued for another 25 minutes. The slurry was then passed through an attrition mill at 0.005" gap setting.

The milled slurry was cooled to −8° C., by circulating through a scraped surface heat exchanger, was transferred back to the mixer, warmed to 17° C. and neutralized by slow addition of an acid solution prepared from 23.7 Kg of 93% aqueous sulfuric acid, 18.8 Kg of urea and 22.5 Kg of ice. After equilibration, the final pH of the slurry was adjusted to 7.2.

The total slurry was divided into eight approximately equal parts. Each part was poured onto a flatbed suction tray containing a fine muslin sheet, distributed for uniform thickness, covered with a rubber dam and sucked with laboratory line vacuum. The sucked out, neutral liquid was collected in a heavy-walled, cylindrical trap. After 15–20 minutes of suction, the pads were weighed on stainless steel wire frames, dried in a walk-in oven at 66° C., and then placed in a high air velocity evaporation oven in a vertical array. The pads were first heated at 98° C. to constant weights and then at 160° C. to weight losses corresponding to 1.1±0.2 moles of ammonia loss per mole of anhydroglucose.

Seven out of the eight pads were slurried in ambient water, and the slurry was passed through an attrition mill and drained to an adjusted weight of 74.6 Kg. Forty-five kilograms of 25% aqueous sodium hydroxide was added to the slurry and mixed under a vacuum of 25" of mercury for 5 minutes. Thirty-two kilograms of ice was added and the mixing continued, under vacuum, for another 20 minutes.

The mixture was then cooled by circulating through a scraped-surface heat exchanger to −7° C. whereupon a clear, fiber-free, viscous solution was obtained. The solution was filtered through a 100 micron filter and de-aerated by passing twice through a vertical thin-film de-aerator, operated at a vacuum of 28" of mercury.

The filtered, de-aerated dope was used to produce fibrous casing, having a stuffing diameter of about 52 mm., using typical commercial regenerated cellulose fibrous casing manufacturing techniques. Line pitching, coagulation, regeneration, washing, plasticization and drying operations proceeded smoothly to produce two (2) small reels of fibrous casing, totaling approximately 700 feet.

The casing was stuffed with semi-dry sausage emulsion and the subsequent processing of the sausages went smoothly to produce semi-dry sausages.

The scanning electron microscopy (SEM) of this non-optimized fibrous casing cross-section revealed a slightly higher degree of voids at the fiber-matrix interfaces than normally found in viscose casing.

What is claimed is:

1. In a process for synthesizing cellulose aminomethanate, wherein cellulose is slurried in aqueous caustic solution with urea, steeped to form a mixture of swelled cellulose intermingled with urea, and heated to form cellulose aminomethanate, the improvement comprising neutralizing the mixture, after steeping, with an acidic neutralizing solution and heating the neutralized mixture to form the aminomethanate.

2. The process of claim 1 wherein a neutral liquor containing urea and a salt of the neutralizing solution is removed, by separation, prior to heating.

3. The process of claim 2 wherein the separation comprises filtration.

4. The process of claim 3 wherein said filtration is under reduced pressure.

5. The process of claim 2 wherein the neutral liquor is regenerated, after removal, and recycled.

6. The process of claim 1 wherein the mixture is neutralized by the addition of an organic acid.

7. The process of claim 1 wherein the mixture is neutralized by the addition of an inorganic acid.

8. The process of claim 1 wherein the mixture is neutralized in the presence of aqueous urea.

9. The process of claim 7 wherein the acid is sulfuric acid.

10. The process of claim 6 wherein the acid is acetic acid.

11. The process of claim 6 wherein the acid is carbon dioxide.

12. The process of claim 2 wherein an acid solution is regenerated and recycled from the neutral liquor.

13. The process of claim 2 wherein the neutral liquid is used to regenerate a caustic steeping liquid for recycle.

14. The process of claim 8 wherein aqueous urea is separated from the mixture, recovered and recycled.

15. The process of claim 14 wherein the urea is recovered by passing through an ion-exchanger.

16. The process of claim 12 wherein the acid is regenerated by passing through an ion-exchanger.

17. The process of claim 2 wherein a caustic solution is recovered.

18. The process of claim 17 wherein the caustic solution is regenerated by passing through a ion-exchanger.

19. The process of claim 1 wherein cellulose, in a weight ratio of from about 1:6 to about 1:15, is slurried with an aqueous solution comprising from about 2 to about 10% by weight caustic and about 12 to about 35% by weight urea, steeped at a temperature from about 0 degrees centigrade to about −10 degrees centigrade for a time sufficient to form a mixture of swelled cellulose intermingled with urea, neutralized by the addition of an aqueous acidic solution and thereafter heated to form the cellulose aminomethanate.

20. The process of claim 19 wherein the aqueous acidic solution comprises aqueous urea.

21. The process of claim 19 wherein the aqueous acidic solution comprises an inorganic acid.

22. Cellulose aminomethanate, produced by a process wherein cellulose is slurried, in a weight ratio of from about 1:6 to about 1:15, with an aqueous solution comprising from about 2 to about 10% by weight caustic and from about 12 to about 35% by weight urea, steeped at a temperature from about 0 degrees centigrade to about −10 degrees centigrade for a time sufficient to permit swelling of the cellulose and distribution of the urea in the vicinity of available hydroxy units within the swelled cellulose structure, neutralized by the addition of an acidic solution, and heated to a temperature sufficient to cause reaction of the urea with the cellulose structure.

23. The cellulose aminomethanate of claim 22 wherein from 0.5 to 30 numerical percent of the cellulose hydroxy groups have been substituted with aminomethanate groups.

24. A tubular sausage casing comprising the cellulose aminomethanate of claim 22.

* * * * *